United States Patent
Hu et al.

(10) Patent No.: US 9,030,629 B2
(45) Date of Patent: May 12, 2015

(54) LIGHT GUIDING SYSTEM, EDGE-LIGHTING BACKLIGHT MODULE AND LIQUID CRYSTAL DISPLAY

(71) Applicant: Shenzhen China Star Optoelectronics Technology Co., Ltd., Shenzhen, Guangdong (CN)

(72) Inventors: Che-chang Hu, Shenzhen (CN); Hu He, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 189 days.

(21) Appl. No.: 13/818,772

(22) PCT Filed: Jan. 21, 2013

(86) PCT No.: PCT/CN2013/070801
§ 371 (c)(1),
(2) Date: Feb. 25, 2013

(87) PCT Pub. No.: WO2014/110835
PCT Pub. Date: Jul. 24, 2014

(65) Prior Publication Data
US 2014/0300843 A1    Oct. 9, 2014

(30) Foreign Application Priority Data
Jan. 15, 2013 (CN) .......................... 2013 1 0013873

(51) Int. Cl.
*G02F 1/1333* (2006.01)
*F21V 8/00* (2006.01)
*G02F 1/1335* (2006.01)
*G02F 1/133* (2006.01)

(52) U.S. Cl.
CPC ........ *G02B 6/0008* (2013.01); *G02F 1/133615* (2013.01); *G02B 6/0068* (2013.01); *G02F 1/133* (2013.01); *G02B 6/0011* (2013.01); *G02F 1/133524* (2013.01); *G02F 1/1336* (2013.01); *G02F 2001/133618* (2013.01)

(58) Field of Classification Search
CPC ........................ G02F 1/133615; G02B 6/0068
USPC ........................................................ 349/65
See application file for complete search history.

(56) References Cited

FOREIGN PATENT DOCUMENTS

CN    102494297 A    6/2012

*Primary Examiner* — Phu Vu
(74) *Attorney, Agent, or Firm* — Andrew C. Cheng

(57) ABSTRACT

A light guiding system includes an ambient light gathering system for absorbing the ambient light to generate absorbed light; multiple light guiding devices each of which includes a light input end near the ambient light gathering system and a light output end near an incident side of a light guiding plate, and multiple light diffusion devices between the light output end and the incident side of the light guiding plate, for broadening a light-emitting angle of the light output end. The absorbed light enters the light input end and is guided to the light output end to form a backlight source. The light guiding system utilizes a light diffusion device to broaden the light-emitting angle of the light output end such that the light uniformity of the light output end is improved and the optical quality of the edge-lighting backlight module is raised.

16 Claims, 5 Drawing Sheets

LIGHT GUIDING SYSTEM, EDGE-LIGHTING BACKLIGHT MODULE AND LIQUID CRYSTAL DISPLAY

BACKGROUND OF THE INVENTION

1. Field of the Invention

The invention relates to a liquid crystal display, and more particularly, to a light guiding system, edge-lighting backlight module and related liquid crystal display.

2. Description of the Prior Art

Recently, most of the liquid crystal displays (LCD) utilizes a light source as a backlight source in the backlight module. Here, the light source means a light source consuming power to generate lights, such as light emitting diode (LED). As is known, LED has a very good light emitting efficiency with low power consumption, and is therefore widely used as the light source in the backlight module. However, according to the power saving and environment concerns, the power consumption of the backlight source has to be reduced further, the number of LED should be reduced or a new low-power light source should be developed and used in the backlight module.

For example, a novel solution is to utilize the ambient lights as a backlight source in the backlight module. This solution does not require a light source using electricity, or, at least reduce the number of light sources using electricity. In this way, the power consumption can be reduced. A possible solution is to gather the ambient lights and utilize multiple optical fibers to transfer lights to the backlight module such that the ambient lights can be used as a backlight source of the backlight module. Furthermore, the number of optical fibers can be adjusted to adjust the number of the backlight source. However, because the light-generating angle of the output end of the optical fiber is small, the luminance difference between the front of the light output end and the light output end (the left side and the right side of the light output end) is huge. This luminance difference may be very obvious to form imbalances. In a worst case, the position of every light output end can be distinguished and the optical quality of the backlight module is severely ruined.

SUMMARY OF THE INVENTION

It is therefore one of the primary objectives of the claimed invention to provide a light guiding system, an edge-lighting backlight module, and an LCD, to solve the above-mentioned problems.

According to an exemplary embodiment of the present invention, a light guiding system is disclosed. The light guiding system comprises an ambient light gathering system, a plurality of light guiding devices, and a plurality of light diffusion devices. The ambient light gathering system facing to ambient light is used for absorbing the ambient light and generated absorbed light. Each light guiding device comprises a light input end near the ambient light gathering system and a light output end near an incident side of a light guiding plate. The absorbed light enters the light input end and is guided to the light output end to form a backlight source. The plurality of light diffusion devices between the light output end and the incident side of the light guiding plate are used for broadening a light-emitting angle of the light output end.

According to an exemplary embodiment of the present invention, an edge-lighting backlight module is disclosed. The edge-lighting backlight module comprises a light guiding plate, a back plate, and a light guiding system. The light guiding plate comprises an incident side, a bottom side connected to the incident side, a top side connected to the incident side and opposite to the bottom side. The back plate is disposed under the bottom side. The optical film is disposed above the top side. The light guiding system comprises an ambient light gathering system, a plurality of light guiding devices, and a plurality of light diffusion devices. The ambient light gathering system facing to ambient light is used for absorbing the ambient light and generated absorbed light. Each light guiding device comprises a light input end near the ambient light gathering system and a light output end near an incident side of a light guiding plate. The absorbed light enters the light input end and is guided to the light output end to form a backlight source. The plurality of light diffusion devices between the light output end and the incident side of the light guiding plate are used for broadening a light-emitting angle of the light output end.

According to an exemplary embodiment of the present invention, a liquid crystal display is disclosed. The liquid crystal display comprises a light guiding plate, a back plate, and a light guiding system. The light guiding plate comprises an incident side, a bottom side connected to the incident side, a top side connected to the incident side and opposite to the bottom side. The back plate is disposed under the bottom side. The optical film is disposed above the top side. The light guiding system comprises an ambient light gathering system, a plurality of light guiding devices, and a plurality of light diffusion devices. The ambient light gathering system facing to ambient light is used for absorbing the ambient light and generated absorbed light. Each light guiding device comprises a light input end near the ambient light gathering system and a light output end near an incident side of a light guiding plate. The absorbed light enters the light input end and is guided to the light output end to form a backlight source. The plurality of light diffusion devices between the light output end and the incident side of the light guiding plate are used for broadening a light-emitting angle of the light output end.

In one aspect of the present invention, the light guiding device is an optical fiber, and the light diffusion device is a double-concave lens.

In another aspect of the present invention, the light guiding device is an optical fiber, and the light diffusion device is a plano-concave lens.

In another aspect of the present invention, the light output end is located at a position corresponding to a center of the light diffusion device, and a width of the light diffusion device complies with a following condition: W<P, where W is the width of the light diffusion device, and P is a distance between adjacent two light output ends.

In still another aspect of the present invention, the light guiding system further comprises a plurality of light sources, arranged alternatively with the light output ends.

In yet another aspect of the present invention, the light output end is located at a position corresponding to a center of the light diffusion device, and a width of the light diffusion device complies with following conditions: W<$P_2$-L, and W<$P_1$-L, where W denotes the width of the light diffusion device, $P_1$ is a distance between adjacent two light output ends, and $P_2$ denotes a distance between adjacent two light sources.

In contrast to the related art, the present invention light guiding system, edge-lighting backlight module, and LCD utilize ambient lights as a backlight source of the backlight module. This can reduce the utilization of common powered light sources and save the power. Furthermore, the light guiding system utilizes a light diffusion device to broaden the light-emitting angle of the light output end such that the uniformity of the light output end can be improved and the optical quality of the edge-lighting module is raised.

DETAILED DESCRIPTION OF THE PREFERRED EMBODIMENT

In order to illustrate the technique and effects of the present invention, a detailed description will be disclosed by the following disclosure in conjunction with figures. Please note, the same components are labeled by the same number.

Embodiment 1

Figure 1:
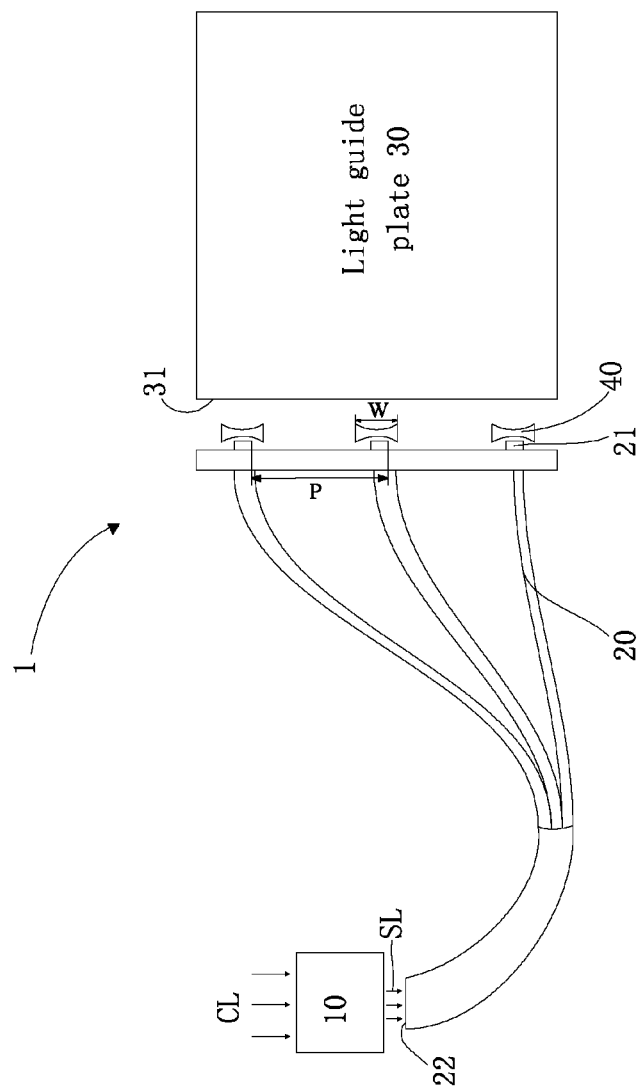
FIG. 1 is a diagram showing a light guiding system according to a first embodiment of the present invention.

Please refer to FIG. 1. As shown in FIG. 1, the light guiding system 1 comprises an ambient light gathering system 10, a plurality of optical fibers 20, a plurality of double-concave lens 40. Specifically, the ambient light gathering system 10 fronts onto the ambient lights and absorbs the ambient lights CL, and then transforms the ambient lights CL into absorbed lights SL. Please note, the ambient lights can be emitted from the sun, light bulbs, or other light-emitting objects.

The wavelength of the absorbed lights SL lies in the range of visible lights. Therefore, the absorbed lights SL can be used as a backlight source of the backlight module. Each optical fiber 20 comprises a light output end 21 and a light input end 22. The input ends of the optical fibers 20 are collected as a bundle near the ambient light gathering system 10. The output ends of the optical fibers 20 are arranged at the output input side of the light guiding plate 30. Preferably, the light output ends 21 are equally-spaced. Please note, the number and the arrangement of the light output ends 21 are not limited as that shown in FIG. 1. Instead, they can be determined according to actual demands. In addition, each of the double-concave lens 40 is respectively established between each of the output ends of the optical fibers 20 and the incident side 31 of the light guiding plate 30.

The absorbed lights SL enters the optical fiber 20 via the light input end 22, and are guided to the light output end 21 via the optical fiber 20. The lights emitted from the light output end 21 are guided into the incident side 31 of the light guiding plate 30 via the double-concave lens 40. Please note, the optical fiber 20 is a good light-guiding device. That is, the energy loss when lights are guided via the optical fiber 20 is very low. Furthermore, the double-concave lens 40 is utilized as a light diffusion device for broadening the light-emitting angle of the light output end.

In this embodiment, in order to broaden the light-emitting angle the most, optimally, the light output end 21 is established at the center of the double-concave lens 40 and an appropriate distance between the light output end 21 and the double-concave lens 40 is set. The lights emitted from the light output end 21 are guided to the incident side 31 via the double-concave lens 40. In order to improve the optical uniformity of the incident side 31, the width of the double-concave lens 40 should be determined as the following equation:

$$W < P \qquad \text{equation (1)},$$

where W denotes the width of the double-concave lens 40, and P denotes a distance between two adjacent light output ends 21.

In the following disclosure, how the double-concave lens 40 broadens the light-emitting angle of the light output end 21 will be illustrated.

Figure 2:
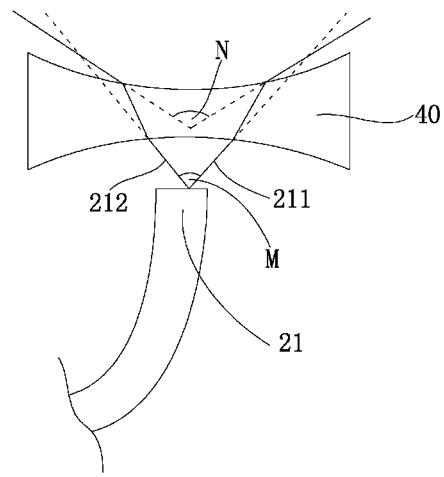
FIG. 2 is a diagram illustrating how a double-concave lens broadens the light-emitting angle of the light output end.

Please refer to FIG. 2. Two lights 211 and 212 emitted from the light output end 21 are selected as an example. Assume that the double-concave lens 40 is not established in front of the light output end 21, the lights 211 and 212 pass along a straight line. That is, the routes of the lights 211 and 212 are depicted as the dotted lines, and it means that the original light-emitting angle is M. However, in this embodiment, because of the double-concave lens 40, the lights 211 and 212 are refracted at the boundaries of the double-concave lens 40. That is because the index of fraction of the double-concave lens 40 is larger than that of air. Therefore, the actual routes of the lights 211 and 212 are depicted as the black lines shown in FIG. 2. It can be seen that the light-emitting angle of the double-concave lens 40 becomes N, which is equal to the included angle of the two lights 211 and 212 (the black lines). Please note, the light-emitting angle N is larger than the original light emitting angle M. It can be understood that other lights emitted from the light output end 21 also obey the same rule. Therefore, the light-emitting angle is broadened by the double-concave lens 40.

Please note, the double-concave lens 40 can be replaced by the plano-concave lens 41, and how the plano-concave lens 41 broadens the light-emitting angle will be illustrated in the following disclosure.

Figure 3:
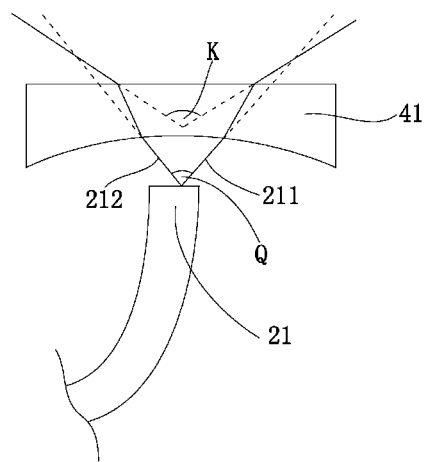
FIG. 3 is a diagram illustrating how a plano-concave lens broadens the light-emitting angle of the light output end.

Please refer to FIG. 3. The concave of the plano-concave lens 41 is near the light output end 21. Two lights 211 and 212 emitted from the light output end 21 are selected as an example. Assume that the plano-concave lens 41 is not established in front of the light output end 21, the lights 211 and 212 pass along a straight line. That is, the routes of the lights 211 and 212 are depicted as the dotted lines, and the original light-emitting angle is Q. However, in this embodiment, because of the plano-concave lens 41, the lights 211 and 212 are refracted at the boundaries of the plano-concave lens 41. That is because the index of fraction of the plano-concave lens 41 is larger than that of air. Therefore, the actual routes of the lights 211 and 212 are depicted as the black lines shown in FIG. 3. It can be seen that the light-emitting angle of the plano-concave lens 41 becomes K, which is equal to the included angle of the two lights 211 and 212 (the black lines). Please note, the light-emitting angle K is larger than the original light emitting angle Q. It can be understood that other lights emitted from the light output end 21 also obey the same rule. Therefore, the light-emitting angle is broadened by the plano-concave lens 41.

Figure 4:
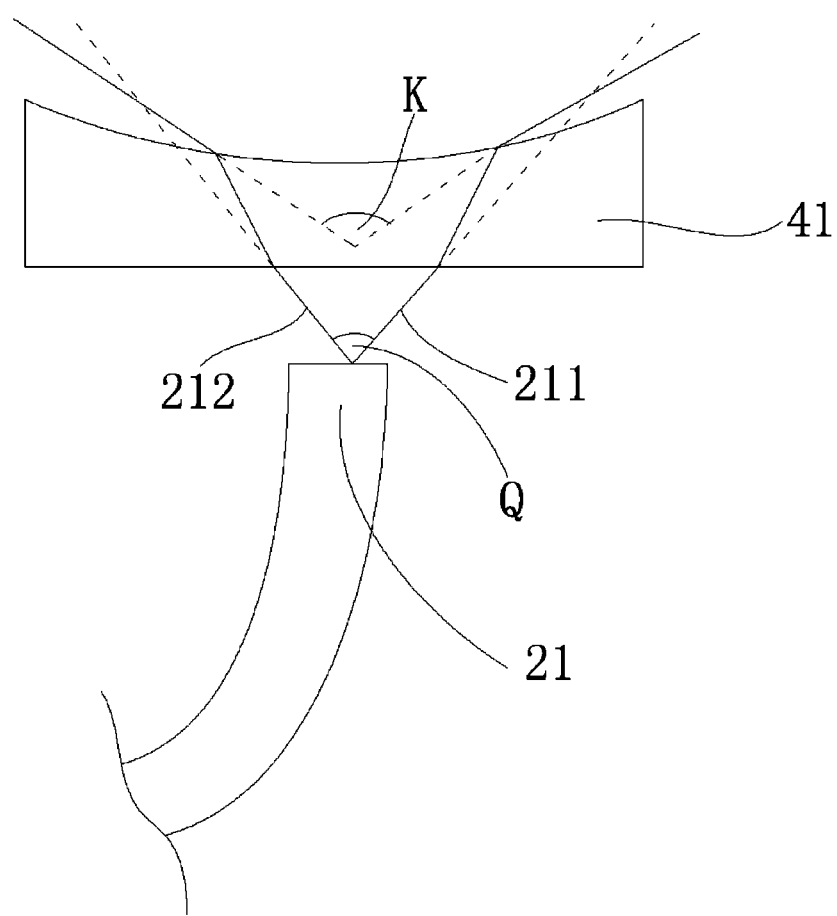
FIG. 4 is a diagram showing another configuration of the plano-concave lens according to the first embodiment of the present invention.

Please refer to FIG. 4. The flat surface of the plano-concave lens 41 can be established near the light output end 21. The lights 211 and 212 are refracted at the flat surface of the plano-concave lens 41 first, and then refracted again at the concave of the plano-concave lens 41. It can be seen the light-emitting angle K is larger than the original light-emitting angle Q. This can also broaden the light-emitting angle.

Embodiment 2

Please note, in the following disclosure, only the differences between the first and the second embodiments will be illustrated, and those similar to the first embodiment will be omitted.

The light emitting diode (LED) is utilized as a common light source of the backlight module. As mentioned previously, it is powered by an outside power source. Surely, the common light source can be CCFL or any other light generating device powered by an outside power source.

Figure 5:
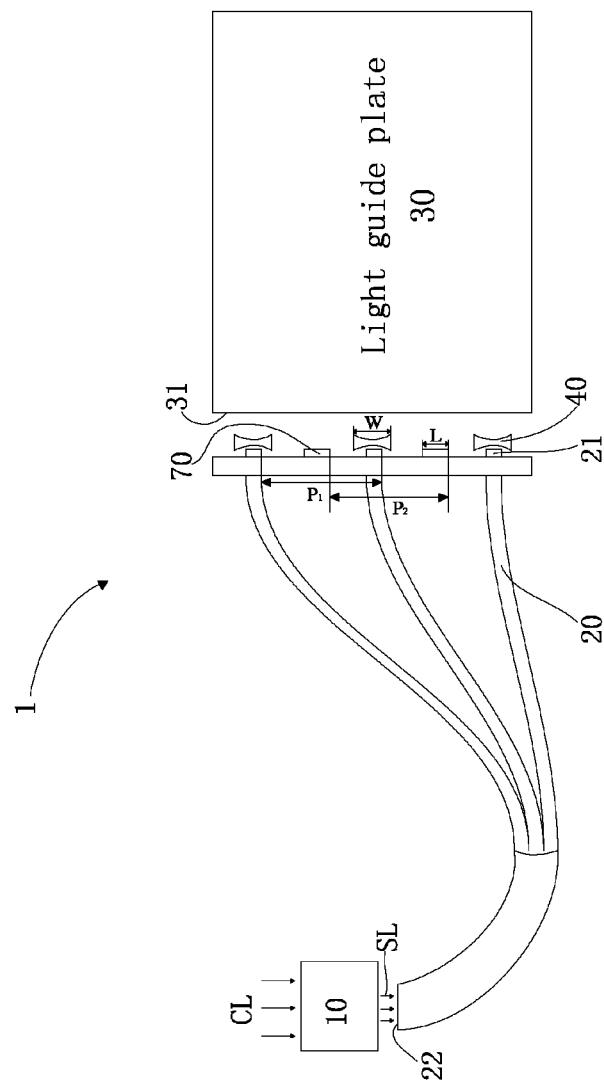
FIG. 5 is a diagram showing a light guiding system according to a second embodiment of the present invention.

Please refer to FIG. 5. The light guiding system 1 further comprises a plurality of LEDs 70. The LEDs 70 and the light output ends 21 are arranged alternatively, and a double-concave lens 40 is established between the light output end 21 and the incident side 31. Similarly, the double-concave lens 40 can be replaced by the plano-concave lens 41. In this way, the LEDs 70 and light output ends 21 are combined together as the backlight source.

Please note, in order to broaden the light-emitting angle of the light output end 21, in a preferred embodiment, the light output end 21 is established at the center of the double-concave lens 40, and an appropriate distance between the light output end 21 and the double-concave lens 40 is set. Moreover, in order to mix and match the lights emitted from the light output end 21 via the double-concave lens 40 and the lights emitted from the LED 70 and reduce the optical imbalance of the incident side 31, the width of the double-concave lens 40 should comply with the following equation (2):

$$W<P_2-L, \text{ and } W<P_1-L \qquad \text{equation (2)}$$

In equation (2), W is the width of the double-concave lens 40, $P_1$ is the distance between two adjacent light output ends 21, $P_2$ is the distance between two adjacent LEDs 70, and L is the width of the LED 70.

The light guiding systems of the first and the second embodiments are often utilized in an edge-lighting backlight module of the LCD. In the following disclosure, the edge-lighting backlight module and the LCD utilizing the light guiding system of the first embodiment or the second embodiment will be illustrated.

Figure 6:
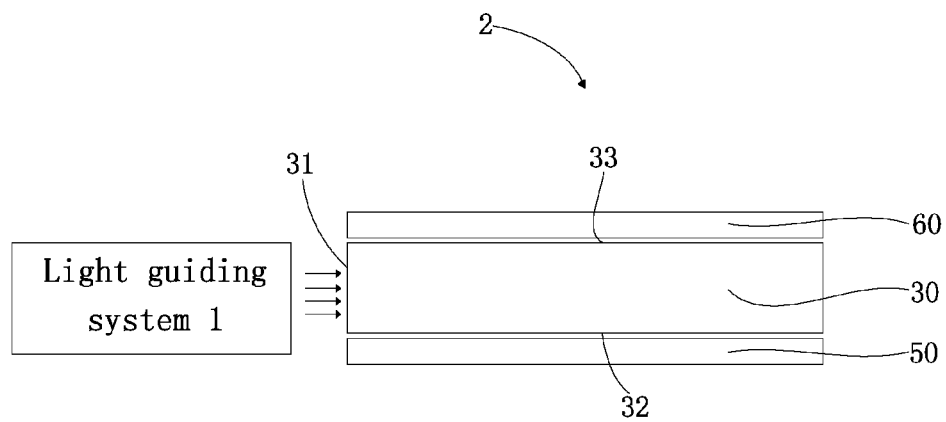
FIG. 6 is a diagram showing an edge-lighting backlight module according to the first or the second embodiments of the present invention.

Please refer to FIG. 6. The edge-lighting backlight module 2 comprises a back plate 50, a light guiding plate 30, an optical film 60, and a light guiding system of the first embodiment or the second embodiment. The light guiding plate 30 comprises an incident side 31 and opposite bottom side 32 and top side 33 connected to the incident side 31. The back plate 50 is established under the bottom side 32. The optical film 33 is established above the top side 33. The lights emitted from the light guiding system 1 of the first or the second embodiments enters the light guiding plate 30 via the incident side 31 and are mixed uniformly. And then, well-mixed lights are emitted from the top side 33.

Figure 7:
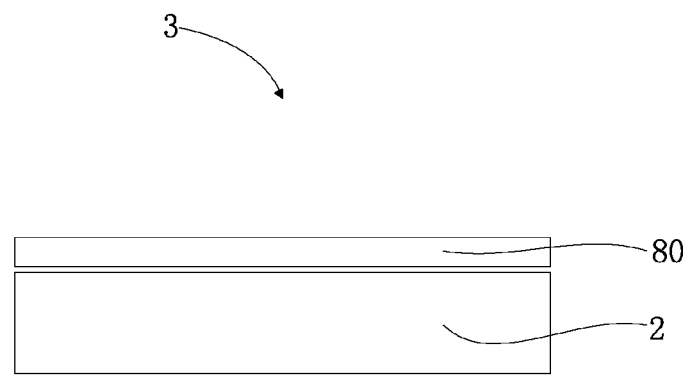
FIG. 7 is a diagram showing a liquid crystal display according to the first or the second embodiments of the present invention.

Please refer to FIG. 7. The display panel 80 is established above the edge-lighting backlight module 2 to form a complete LCD 3. The edge-lighting module 2 provides lights to the display panel 80 such that the display panel 80 can display images.

In contrast to the related art, the present invention light guiding system, edge-lighting backlight module, and LCD utilize ambient lights as a backlight source. This does not need any common light sources, which should be powered, or, at least reduce the number of common light sources. This can save the power. In addition, the present invention utilizes a light diffusion device to broaden the light-emitting angle of the light output end such that the optical uniformity of the light output end is improved and the optical quality of the edge-lighting backlight module is raised.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light guiding system comprising:
   an ambient light gathering system, facing to ambient light, for absorbing the ambient light to generate absorbed light;
   a plurality of light guiding devices, each light guiding device comprising a light input end near the ambient light gathering system and a light output end near an incident side of a light guiding plate, and the absorbed light entering the light input end and being guided to the light output end to form a backlight source; and
   a plurality of light diffusion devices between the light output end and the incident side of the light guiding plate, for broadening a light-emitting angle of the light output end;
   wherein the light output end is located at a position corresponding to a center of the light diffusion device, and a width of the light diffusion device complies with a following condition: W<P, where W denotes the width of the light diffusion device, and P denotes a distance between adjacent two light output ends.

2. The light guiding system of claim 1, wherein the light guiding device is an optical fiber, and the light diffusion device is a double-concave lens.

3. The light guiding system of claim 1, wherein the light guiding device is an optical fiber, and the light diffusion device is a plano-concave lens.

4. The light guiding system of claim 1, further comprising a plurality of light sources, arranged alternatively with the light output ends.

5. The light guiding system of claim 4, wherein the light output end is located at a position corresponding to a center of the light diffusion device, and a width of the light diffusion device complies with following conditions: $W<P_2-L$, and $W<P_1-L$, where W denotes the width of the light diffusion device, $P_1$ denotes a distance between adjacent two light output ends, and $P_2$ denotes a distance between adjacent two light sources.

6. An edge-lighting backlight module, comprising:
   a light guiding plate, comprising an incident side, a bottom side connected to the incident side, and a top side connected to the incident side and opposite to the bottom side;
   a back plate under the bottom side;
   an optical film above the top side; and
   a light guiding system comprising:
     an ambient light gathering system, facing to ambient light, for absorbing the ambient light to generate absorbed light;
     a plurality of light guiding devices, each light guiding device comprising a light input end near the ambient light gathering system and a light output end near an incident side of a light guiding plate, and the absorbed light entering the light input end and being guided to the light output end to form a backlight source;

a plurality of light diffusion devices between the light output end and the incident side of the light guiding plate, for broadening a light-emitting angle of the light output end;

wherein the light output end is located at a position corresponding to a center of the light diffusion device, and a width of the light diffusion device complies with a following condition: W<P, where W denotes the width of the light diffusion device, and P denotes a distance between adjacent two light output ends.

7. The edge-lighting backlight module of claim 6, wherein the light guiding device is an optical fiber, and the light diffusion device is a double-concave lens.

8. The edge-lighting backlight module of claim 6, wherein the light guiding device is an optical fiber, and the light diffusion device is a plano-concave lens.

9. The edge-lighting backlight module of claim 6, further comprising a plurality of light sources, arranged alternatively with the light output ends.

10. The edge-lighting backlight module of claim 9, wherein the light output end is located at a position corresponding to a center of the light diffusion device, and a width of the light diffusion device complies with following conditions: $W<P_2-L$, and $W<P_1-L$, where W denotes the width of the light diffusion device, $P_1$ denotes a distance between adjacent two light output ends, and $P_2$ denotes a distance between adjacent two light sources.

11. A liquid crystal display, comprising:
a light guiding plate comprising an incident side, a bottom side connected to the incident side, a top side connected to the incident side and opposite to the bottom side;
a back plate under the bottom side;
an optical film above the top side;
a display panel above the optical film; and
a light guiding system comprising:

an ambient light gathering system, facing to ambient light, for absorbing the ambient light to generate absorbed light;
a plurality of light guiding devices, each light guiding device comprising a light input end near the ambient light gathering system and a light output end near an incident side of a light guiding plate, and the absorbed light entering the light input end and being guided to the light output end to form a backlight source; and
a plurality of light diffusion devices between the light output end and the incident side of the light guiding plate, for broadening a light-emitting angle of the light output end.

12. The liquid crystal display of claim 11, wherein the light guiding device is an optical fiber, and the light diffusion device is a double-concave lens.

13. The liquid crystal display of claim 11, wherein the light guiding device is an optical fiber, and the light diffusion device is a plano-concave lens.

14. The liquid crystal display of claim 11, wherein the light output end is located at a position corresponding to a center of the light diffusion device, and a width of the light diffusion device complies with a following condition: W<P, where W denotes the width of the light diffusion device, and P denotes a distance between adjacent two light output ends.

15. The liquid crystal display of claim 11 further comprising a plurality of light sources, arranged alternatively with the light output ends.

16. The liquid crystal display of claim 15, wherein the light output end is located at a position corresponding to a center of the light diffusion device, and a width of the light diffusion device complies with following conditions: $W<P_2-L$, and $W<P_1-L$, where W is the width of the light diffusion device, $P_1$ denotes a distance between adjacent two light output ends, and $P_2$ denotes a distance between adjacent two light sources.

* * * * *